US012371155B2

(12) United States Patent
Zapata et al.

(10) Patent No.: US 12,371,155 B2
(45) Date of Patent: Jul. 29, 2025

(54) COUPLING METHOD FOR REDUNDANT SERVO DEVICES OF AN ACTUATOR CONTROL SYSTEM, ASSOCIATED SYSTEM AND DEVICE

(71) Applicant: ZIPAIR, Chateauneuf-les-Martigues (FR)

(72) Inventors: Frankie Zapata, Carry-le-Rouet (FR); Laurent Aulagnier, Marseilles (FR); Frédéric Bighelli, Rians (FR); Benoît Imbert, Marseilles (FR); Adrien Uhl, Aix-en-Provence (FR)

(73) Assignee: ZIPAIR, Chateauneuf-les-Martigues (FR)

( * ) Notice: Subject to any disclaimer, the term of this patent is extended or adjusted under 35 U.S.C. 154(b) by 0 days.

(21) Appl. No.: 18/837,502

(22) PCT Filed: Sep. 26, 2023

(86) PCT No.: PCT/FR2023/051476
§ 371 (c)(1),
(2) Date: Aug. 9, 2024

(87) PCT Pub. No.: WO2024/069093
PCT Pub. Date: Apr. 4, 2024

(65) Prior Publication Data
US 2025/0108912 A1    Apr. 3, 2025

(30) Foreign Application Priority Data
Sep. 29, 2022  (FR) ........................ 2209922

(51) Int. Cl.
*B64C 19/00*    (2006.01)
*G05B 6/02*    (2006.01)

(52) U.S. Cl.
CPC ............. *B64C 19/00* (2013.01); *G05B 6/02* (2013.01)

(58) Field of Classification Search
CPC ................ B64C 19/00; G05B 6/02
See application file for complete search history.

(56) References Cited

U.S. PATENT DOCUMENTS

| 5,568,615 A | 10/1996 | Sederlund et al. |
| 6,665,596 B2 * | 12/2003 | Bauer ............... B60W 50/00 701/34.3 |

(Continued)

FOREIGN PATENT DOCUMENTS

| EP | 0645026 A1 | 3/1995 |
| EP | 3495262 A1 | 6/2019 |
| WO | 9325945 A1 | 12/1993 |

OTHER PUBLICATIONS

International Search Report (PCT/ISA/210) with translation and Written Opinion (PCT/ISA/237) Mailed on Nov. 14, 2023, by the European Patent Office as the International Searching Authority for International Application No. PCT/FR2023/051476. (14 pages).

*Primary Examiner* — Tyler J Lee
(74) *Attorney, Agent, or Firm* — BUCHANAN, INGERSOLL & ROONEY PC

(57) ABSTRACT

The invention relates to a system for controlling an actuator comprising a plurality of redundant servo devices and producing values of the same magnitude from the same set point and the same measurement data, the redundant servo devices furthermore being in mutual communication so that each redundant servo device accesses, by reading, the last values of the variable produced by the redundant servo devices and implements a method for correcting the respective productions thereof by coupling. The invention thus prevents any divergence of these variables. Such a system may equip a vehicle with a load consisting of a driver, a passenger and/or (Continued)

goods or freight and comprising one or more actuators controlled in this way.

16 Claims, 7 Drawing Sheets

(56) References Cited

U.S. PATENT DOCUMENTS

| | | | | |
|---|---|---|---|---|
| 7,181,644 B2* | 2/2007 | Millsap | ............ | G05B 9/03 |
| | | | | 700/89 |
| 7,828,245 B2* | 11/2010 | Suisse | ............ | B64C 13/505 |
| | | | | 244/99.2 |
| 2003/0120401 A1* | 6/2003 | Bauer | ............ | B60G 17/0195 |
| | | | | 701/41 |
| 2003/0133526 A1* | 7/2003 | Millsap | ............ | G05B 9/03 |
| | | | | 375/354 |
| 2008/0185476 A1* | 8/2008 | Suisse | ............ | B64C 13/505 |
| | | | | 244/78.1 |
| 2010/0241330 A1* | 9/2010 | Hartmann | ............ | B60T 8/344 |
| | | | | 701/70 |
| 2021/0171188 A1 | 6/2021 | Charron et al. | | |
| 2022/0176934 A1* | 6/2022 | Cuesta Castro | ...... | B60T 17/221 |

* cited by examiner

COUPLING METHOD FOR REDUNDANT SERVO DEVICES OF AN ACTUATOR CONTROL SYSTEM, ASSOCIATED SYSTEM AND DEVICE

FIELD OF THE INVENTION

The invention relates to the field of servo systems for an actuator. By "servo system" is meant any system designed to reach a setpoint value as quickly as possible and to maintain it regardless of the disturbances caused by the environment of the system as far as possible. The invention relates more particularly to the field of such servo systems when these latter are called "redundant" or "multiple redundancy" to be used for example in land, water or air vehicles. The invention will be described mainly, but without this limiting the present invention in any way whatever, in the context of flight control for an aircraft, whether a pilot is present in said aircraft or remote therefrom, as can be the case for a drone. Such an aircraft is generally in the form of a propulsion device, preferably but non-limitatively a vertical-propulsion device, adapted or arranged to ensure the lifting and moving of a load, whether constituted by a pilot, one or more human or animal passengers and/or one or more solid or liquid goods the transportation of which is to be ensured by the propulsion device.

BACKGROUND

The principle of servoing a variable or a characteristic thereof generally consists of measuring said variable generated by a system and comparing it to a setpoint value. In order for said generated variable to reach the target value determined by the setpoint value as quickly as possible and then maintain it, said setpoint is corrected in view of the difference between the value generated by the system and said setpoint value. Certain servo control systems act on one or more characteristics of such a servoed variable, such as the position, the speed or the acceleration. For this reason, such systems are sometimes described as "negative feedback" or "degenerative feedback" or "closed-loop" control systems. It is also possible to servo different variables and/or characteristics of these latter to ultimately generate a command for an actuator. The concepts of stability and accuracy are often in opposition to the concept of speed. In order to improve the performance of a servo system, it is generally necessary to include a corrector in the servo loop. There are different types of correctors, the action of which can be integral, derivative and/or proportional to the difference measured between the servoed variable and the setpoint. Thus, the term "PID corrector" is used, acronym for "proportional, integral, derivative". Such a regulator is configured by means of gains or coefficients to weight the corrective actions, which are respectively proportional to said difference, the integral and the derivative thereof. The action that can be described as "proportional" contributes directly to the responsiveness and the stability of the servo. The "integral" action makes it possible to erase a residual error and brings accuracy to the system, and the "derivative" action makes it possible to limit oscillations around the setpoint of the servoed variable.

Furthermore, depending on the reliability sought, in particular to constitute systems used in land, sea, aeronautical and/or space transport, such servo systems can be multiple redundancy systems and require a plurality of devices for arbitration of such multiple redundancy.

In engineering, the concept of "redundancy" consists of duplicating critical components or functions of a system with the aim of increasing the reliability of said system. When the safety of potential passengers is at stake, as can be the case during a flight of an aircraft, certain parts of a control system of the latter can be doubled or tripled, and the term double or triple redundancy system is then used. Thus, an error generated by an element associated for example with a malfunction or a performance drift of said element can then be cancelled out or compensated for by the use of one or of the other redundant elements. A multiple redundancy system is also known as a "majority voting/logic system" or "voting logic system" in order to use multiple generation of one and the same variable with a view to controlling an actuator for example.

There are several modes of operation of a multiple redundancy servo system for an actuator. Take the example of a system for controlling an actuator using three similar servo systems, called "twin systems" or "redundant systems", respectively generating, i.e. in parallel with one another, variables that must reflect one and the same setpoint value. The command for the actuator is ultimately generated on the basis of a single or several variables generated by said redundant systems. According to a first known mode of operation, the command for such an actuator is generated on the basis of a variable generated by one of the three servo systems, which is sometimes described as the "primary". It is only when it is observed that said primary is malfunctioning, it being possible to detect such a malfunction by way of too great a difference between the variable delivered by said primary and the average of the variables delivered respectively by its twins, that the control system or an operator of said control system chooses a new primary from among these redundant servo systems as a replacement for the previous one. This solution can become sub-optimal when the values of the servoed variable generated respectively by the redundant servo systems diverge. The reassigning of a primary system, when the three redundant servo systems express variables having very different values, becomes difficult because it is no longer possible to assess a possible malfunction or drift of said current primary if no consensus is apparent between the other redundant systems. Other techniques consist of calculating the average of the variables generated respectively by the redundant servo systems and generating an actuator command for on the basis of said average. This second embodiment is sometimes problematic, in particular when one of the systems delivers a variable the value of which is very different from those generated by its twins. Indeed, the average obtained is adversely affected by the strong drift of said faulty system, itself becoming very different from a relevant value for ultimately generating a suitable actuator command.

SUMMARY

The invention makes it possible to overcome the drawbacks expressed above. Of the numerous advantages brought about by the implementation of the invention, there may be mentioned:

the automatic correction of the generation from a servo device with respect to those from twin servo devices within a multiple redundancy control system prevents the risk of divergence of the generations and increases the relevance thereof;

the distribution within a system for controlling the arbitration and/or correction of the redundant generations improves its reliability without making it complex or hampering the responsiveness of the actuator command generation;

a precise and adaptive correction of the redundant generations with respect to the characteristics of the signals or data items generated, improving the accuracy and the relevance of the commands generated without straining the responsiveness or increasing the cost and the complexity of a system implementing the invention;

the recommendation of the median to take into account the respective generations from at least three redundant servo devices and the latencies caused by the sharing of information between said redundant servo devices, provides a compromise that is particularly relevant during generations of outliers or divergent values.

To this end, the invention provides a method implemented by a processing unit of one servo device from among several redundant servo devices of a system for controlling an actuator, each redundant servo device respectively generating values of one and the same variable on the basis of one and the same setpoint and one and the same measurement data item, said generated values being used by said system to control the actuator, said redundant servo devices being in communication with each other so that each redundant servo device accesses, by reading, the latest values of said variable generated by said redundant servo devices.

In order to prevent any drift of the respective generations of the values of the variable, said method iteratively includes:

a step of generating the current variable value on the basis of the setpoint and the measurement data item;

a step of reading the latest known values of the variable generated by the redundant servo devices of said control system and of building up a set of current values of said variable;

a step of determining a reference value of said variable taken from said set;

a step of calculating a difference between the current value of the generated variable and said reference value;

a step of correcting the current value and generating a corrected current value of the variable consisting of subtracting from said current value a corrective resulting from a calculation according to which said difference is multiplied by a correction coefficient of said current value.

In order to increase the relevance of the value of the generated variable, when said control system includes at least three redundant servo devices able to generate such a value of said variable, the step of determining the reference value advantageously consists of selecting the median of the values of the set of current values of the variable.

In a variant, when said control system only includes two redundant servo devices able to generate such a value of said variable, the step of determining the reference value can consist of choosing one of the values of the set of current values of the variable.

In order to define the coupling of the generation from the redundant servo devices, the value of the correction coefficient can be predetermined.

In a variant, such a coupling can be dynamic. To this end, a method according to the invention can include a step of recording the current or corrected value of the generated variable in a data memory of the servo device in order to build up a log of a determined number of values. Such a method thus includes, prior to the correction step, a step of generating the value of the correction coefficient which is a function of the variability of the values taken from said log and the iteration frequency of the step of reading the latest known values of the variable generated by the redundant servo devices.

Furthermore, to prevent any abrupt correction, or even to smooth the process of correcting the generation of the values of the variable, calculating the value of the corrective is arranged so that said value of the corrective does not, in absolute values, exceed a predetermined limit value.

According to a preferred embodiment according to which the redundant servo devices each include a PID corrector delivering three components of an output signal respectively describing a proportional action, an integral action and a derivative action, the variable can consist of the component describing said integral action of said PID corrector.

In order to increase the reliability of a system for controlling an actuator, it can include redundant sources arranged to jointly deliver a plurality of setpoint values. A method according to the invention can advantageously include a step for generating the setpoint so that the latter takes as a value:

one of the values of said plurality of values when the control system only includes two redundant sources;

the median of said plurality of values when said control system comprises at least three redundant sources.

In order to increase the reliability of a system for controlling an actuator, it can include redundant sources arranged to jointly deliver a plurality of measurement data values. A method according to the invention can advantageously include a step for generating the measurement data item so that the latter takes as a value:

one of the values of said plurality of values when the control system only includes two redundant sources;

the median of said plurality of values when the control system includes at least three redundant sources.

According to a second subject, the invention relates to one servo device from among several redundant servo devices of a system for controlling an actuator, said redundant servo devices each generating a value of one and the same variable on the basis of one and the same setpoint and one and the same measurement data item, said redundant servo devices moreover being in communication with each other so that each servo device accesses, by reading, the latest values of said variable generated by the redundant servo devices. Said servo device is arranged to implement a method according to the invention.

According to a third subject, the invention relates to a system for controlling an actuator including several redundant servo devices, said actuator command being generated on the basis of the plurality of values of the variable generated jointly by the redundant servo devices.

According to an advantageous embodiment, said control system can be arranged such that said command can be generated on the basis of:

one of the values of said plurality of values of the variable generated by the redundant servo devices when said plurality of values only comprises two values;

the median of said plurality of values of the generated variable if said plurality of values comprises at least three values.

According to a fourth subject, the invention relates to a vehicle with a load constituted by a pilot, a passenger and/or goods or merchandise including one or more actuators in the form of at least one thrust unit for moving said vehicle, a command for which is generated by a control system according to the invention.

According to a preferred application, such a vehicle can be an aircraft.

Moreover, according to a fifth subject, the invention relates to a computer program product including one or more program instructions which can be interpreted by a processing unit of one servo device from among a plurality of redundant servo devices of a system for controlling an actuator according to the invention. To this end, said program instructions can be loaded into a non-volatile memory of the servo device and designed such that the execution thereof by said processing unit induces the implementation of a method according to the invention.

According to a sixth subject, the invention relates to a storage medium readable by such a processing unit including the instructions of such a computer program product.

BRIEF DESCRIPTION OF THE DRAWINGS

Other characteristics and advantages will become more clearly apparent on reading the following description and on examination of the accompanying figures, in which.

DETAILED DESCRIPTION

The invention is described, in a preferred but non-limitative manner, through an example of application to the field of flight control of an aircraft or heavier-than-air aircraft, arranged to provide a substantially vertical take-off and landing capability. By way of non-limitative examples, such a propulsion device can consist of a drone, a quadcopter or an octocopter. Document EP 3495262 A1 describes an example of such a propulsion device. However, the invention is not limited to these application examples alone, and could instead be employed with respect to any type of device for propelling a load, a pilot or a passenger.

According to the invention, such a vertical take-off/landing aircraft is moved by a plurality of thrust units. It is different from that taken from document EP 3495262 A1 in that the respective actuation commands of said thrust units are generated by a multiple redundancy control system.

Figure 1:
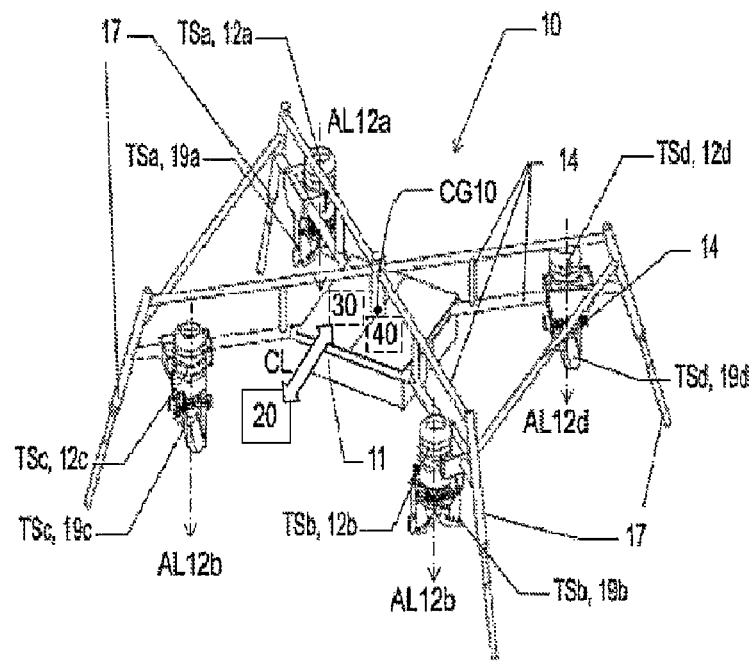
FIGS. 1 and 1A illustrate a first known propulsion device, arranged to provide a substantially vertical take-off and landing capability.

As indicated in FIG. 1, such an aircraft 10 making it possible to lift a load conveyed by the latter according to the technical teachings drawn from the document EP 3495262 A1, consists of a quadcopter including means 14 supporting thrusters, said support means 14 being in the form of four arms describing an "X" above a substantially planar platform 11. Each arm supports a thrust system TSa, TSb, TSc, TSd, each including a thrust unit 12a, 12b, 12c, 12d composed of a thermal thruster, in the form of a turbojet. In order to lift a load, not shown in FIG. 2, conveyed by the platform 11, the four thrust units 12a, 12b, 12c, 12d respectively deliver thrust vectors AL12a, AL12b, AL12c, AL12d, substantially normal to the platform 11. In order to land without damaging the jet nozzles or fluid discharge outlets of the turbojets of the thrust units 12a to 12d, the arms of the support means 14 of the thrust systems TSa, TSb, TSc and TSd cooperate, at the level of their respective distal parts, with advantageously telescopic projecting means or legs 17. A control system 30, in the form of electronic processing means, delivers thrust commands to the thrust systems TSa, TSb, TSc, TSd, for example in the form of PPM (pulse-position modulation) signals according to a modulation technique known for transmitting over a "point-to-point" connection, a symbol of a plurality of bits in a single coded pulse from among an alphabet of 2M possible transitions over time or any other suitable format. The fluid outlets of the thrusters of the thrust systems are positioned above or below, substantially at the level of the centre of gravity CG10 of the device 10 depending on the configuration and arrangement of the support means 14. In order to modify and stabilize the attitude of the platform 11, each thrust system TSa to TSd includes means 19a, 19b, 19c, 19d for correcting the thrust vectors AL12a, AL12b, AL12c, AL12d respectively delivered by the turbojets of the thrust units 12a to 12d.

Figure 2:
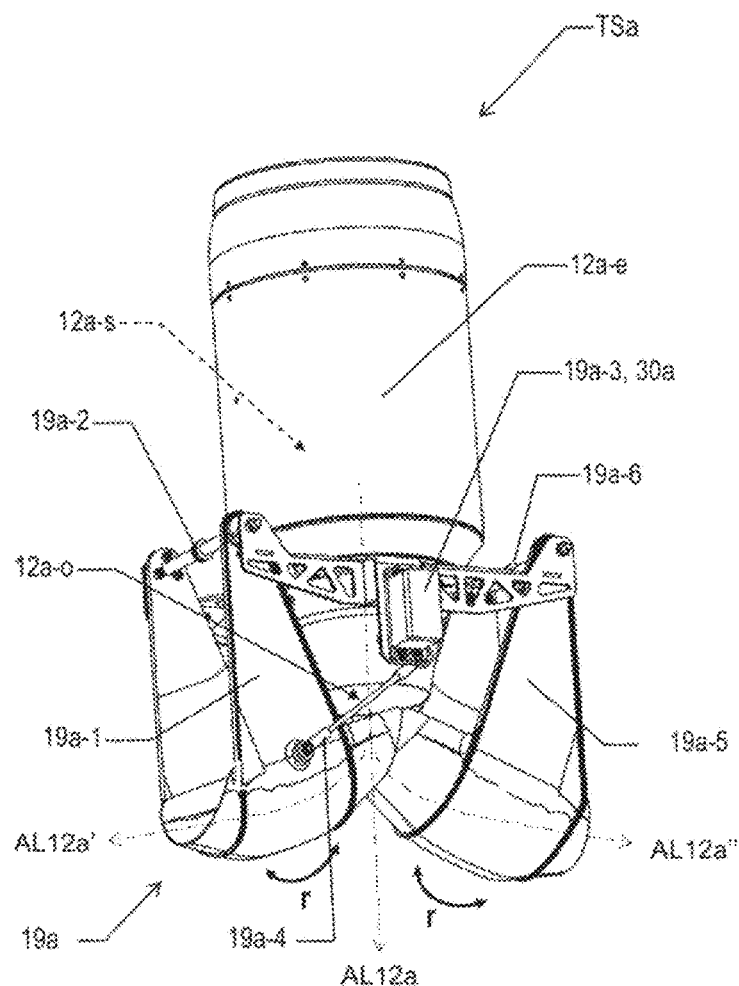
FIG. 2 illustrates the arrangement of a thrust system of such a known propulsion device shown in FIGS. 1 and 1A.

FIG. 2 illustrates the arrangement of such means for correcting the thrust vector 19a of the thrust unit 12a of the thrust system TSa according to FIG. 1. Said means 19a for correcting the thrust vector include a pair of deflector guides 19a-1 and 19a-5 that are moveably mounted, more specifically by means of respective pivot links 19a-2 and 19a-6. Said deflector guides 19a-1 and 19a-5 are arranged to deflect all or part of the thrust vector AL12a at the level of a region close to the fluid discharge outlet 12a-o of the turbojet 12a-e of the thrust unit 12a. The deflector assembly composed of the deflector guides 19a-1 and 19a-5 thus makes it possible to describe a "pinching" of said thrust vector AL12a. The deflector guides 19a-1 and 19a-5 are advantageously actuated respectively by a pair of cam actuators or servomotors, of which only the actuator 19a-3 can be seen in FIG. 1. Thus, the actuator 19a-3 cooperates with the deflector guide 19a-1 by means of a control rod 19a-4. Actuation of the cam of the actuator 19a-3 causes a rotary movement r of the deflector guide 19a-1 about the shaft 19a-2 situated above the fluid discharge region of the turbojet 12a, which limits the torque required by the actuator 19a-3 to overcome and withstand the aspiration or the discharge generated by the thrust vector AL12a delivered by the turbojet 12a-e of the thrust unit 12a during closing and opening of the deflector guide 19a-1. When the cam actuators, such as the actuator 19a-3, associated respectively with the deflector guides 19a-1 and 19a-5 cause a pinching of the thrust vector AL12a by these latter, said thrust vector AL12a is subdivided downstream of said deflector guides into two or three components AL12a, AL12a', AL12a" according to whether a particular deflector guide 19a-1 or 19a-5 enters or does not enter the stream discharged at the fluid outlet 12a-o of the turbojet 12a-e. In an "open" configuration according to which the deflector guides 19a-1 and 19a-5 are positioned substantially outside the trajectory of the thrust vector AL12a, the force of said thrust vector AL12a is maximum. Conversely, when one (or both) of the two deflector guides 19a-1, 19a-5 "pinches" said thrust vector, the thrust force resulting from said thrust vector AL12a, downstream of said deflector guides 19a-1 and 19a-5, is reduced, until it is cancelled out during a "total pinching" of said deflector guides 19a-1 and 19a-5 of the stream from the jet nozzle outlet 12a-o of the turbojet. Depending on the arrangement of said deflector guides 19a-1 and 19a-5, these latter being similar in FIG. 3 to two substantially curvilinear scoops or semi-circular surfaces facing one another, in the event of a "closed" configuration of the two guides 19a-1 and 19a-5, a counterthrust can result, i.e. a thrust vector in an opposite direction to that of the thrust vector AL12a at the fluid discharge outlet 12a-o. Such a counterthrust, for example of the order of ten to thirty percent, can be made possible by virtue of the shape of said guides. Indeed, these latter can be arranged to guide, respectively, fluid flows causing, at the outlet (distal parts) of said guides, secondary thrust vectors AL12a' and AL12a" oriented in substantially opposite directions to the direction of the original thrust vector AL12a at the fluid discharge outlet 12a-o of the turbojet 12a-e.

In a variant, the thrust systems TSa to TSd of the aircraft 10 could each consist of a propellor moved in rotation by an electric and/or thermal engine in order to deliver a thrust equivalent to that described by a thrust system on the basis of a turbojet as described with reference to FIGS. 1 and 1A. Regardless of the embodiments of a thrust system of a propulsion device, an electronic control system 30 controls the respective power of the thrust systems TSa to TSd on the basis of measurements delivered by an inertial navigation system 40 advantageously positioned close to the centre of gravity CG10 of the aircraft 10 and piloting setpoints delivered by a setpoint unit 20 in wired or radio communication CL with the control system 30. The latter thus translates the pilot's orders, via the setpoint unit 20, into a command for actuators (thrusters, deflectors) in order to regulate the thrusts respectively delivered by the thrust systems TSa to TSd inducing the trajectory of the aircraft 10 required by said pilot with regard to the attitude and position of said aircraft estimated by the measurement unit 40.

Figure 1A:
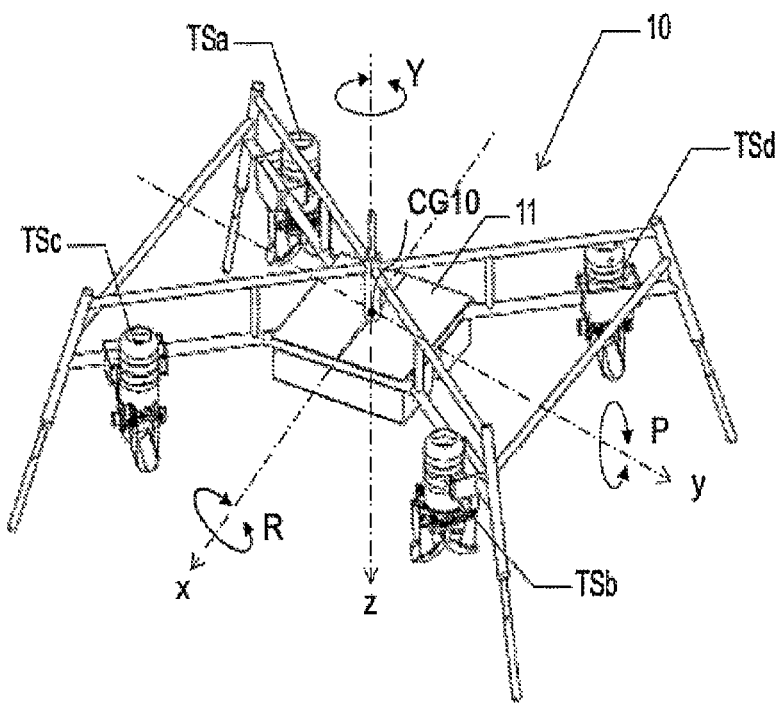

FIG. 1A describes such an aircraft 10 in the light of a reference system determined by three axes x, y, z respectively inscribed in the plane of the platform 11 for the x and y axes and normal to the latter for the z axis. The three axes x, y and z intersect in the centre of gravity CG10 of the aircraft 10. The x axis extends from the tail to the nose of the aircraft and the y axis extends from starboard to port. The z axis describes a vertical, from far away to the ground, when the platform is horizontal. Such an aircraft 10 can move in the air according to rotations R, P, Y induced respectively about said x, y and z axes by the control system 30 intentionally regulating the respective thrusts delivered by the thrust units TSa to TSd. Thus, a vertical elevation of the aircraft 10 is induced by a joint and identical increase of the thrust delivered by the four thrust units TSa to TSd, a sufficient increase to create a lift force greater than the weight of the aircraft 10. Conversely, a vertical displacement from top to bottom of the aircraft is obtained by a linked and identical reduction of the thrusts delivered by the four thrust units TSa to TSd to create a lift force less than the weight of the aircraft 10.

In order to induce a displacement towards the front (nose) or the rear (tail) of the aircraft 10, the control system 30 induces a difference in thrust between the pairs of thrust units respectively formed by the thrust units TSa and TSd for one and by the thrust units TSb and TSc for the other. Thus, a rotation P, also known as "pitch", about the y axis is induced. A relative and combined lift of the pair {TSa, TSd} with regard to the pair {TSb, TSc} induced by a positive thrust differential induces a forward displacement of the aircraft. The inverse induces a displacement of the aircraft 10 backwards.

In order to induce a displacement to port or to starboard, the control system 30 induces a difference in thrust between the pairs of thrust units respectively formed by the thrust units TSa and TSc for one and by the thrust units TSd and TSb for the other. Thus, a rotation R, also known as "roll", about the x axis is induced. A relative and combined lift of the pair {TSa, TSc} with regard to the pair {TSb, TSd} induced by a positive thrust differential induces a displacement to port of the aircraft 10. The inverse induces a displacement of the aircraft 10 to starboard.

The control system 30 can also induce a Y rotation, also known as "yaw", of the aircraft about the z axis. To this end, the control system 30 induces an asymmetric pinching of the deflector guides of each thrust unit TSa to TSd of at least one pair {TSa, TSb} or {TSc, TSd} of thrust units. With reference to FIG. 2, such an asymmetric pinching of the deflector guides 19a1, 19a-5 of the thrust unit TSa generates three components of the thrust resulting from said thrust unit which is not strictly parallel to the direction of discharge of the fluid from the turbojet 12a-e and thus normal to the platform, but which becomes oblique with regard to the latter under the combined effect of one of the components AL12a remaining parallel to the direction of discharge of the fluid by the turbojet 12a-e and of the predominant component from among the components AL12a' or AL12a" substantially normal thereto. Depending on whether the component AL12a' is greater or smaller than the component AL12a", a Y rotation about the y axis is induced in a clockwise or anticlockwise direction.

In order for no lift or loss of altitude to be induced during a yaw, roll ðr pitch, the control system 30 induces an increase equal to the decrease in the combined thrusts delivered by the pair or pairs of thrust units involved by such asymmetric pinching of their deflector guides such that the overall lift force delivered by all of the thrust units is constant.

Figure 3:
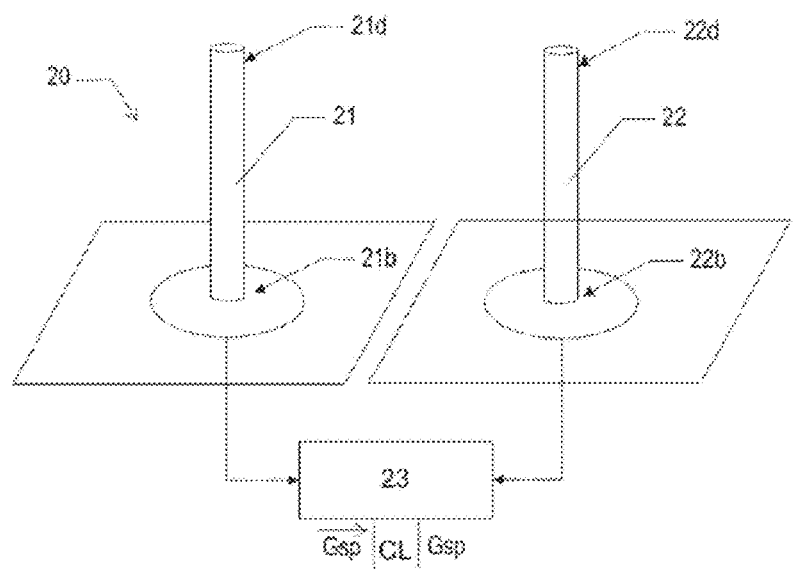
FIGS. 3 and 3A illustrate the arrangement of a setpoint unit including a human-machine input interface for translating human instructions for piloting an aircraft, such as that described with reference to the preceding figures.

In order to translate the pilot's instructions, as indicated in FIG. 3, a setpoint unit 20 can consist of a human-machine input interface including input peripherals in the form of a pair of handles or levers 21 and 22, also called joysticks. The invention is not limited to this choice of input peripherals alone, these latter being able to comprise, in addition or as a variant, a plurality of buttons, a tactile surface or any other equivalent and suitable means.

Figure 3A:
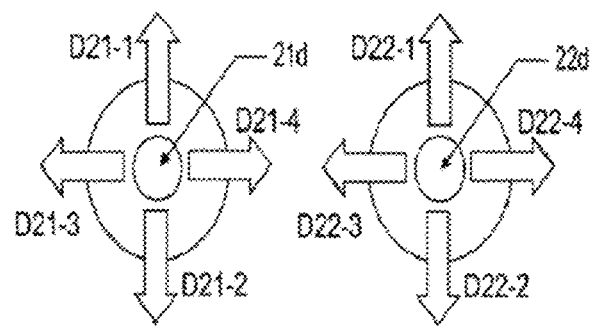

By way of example according to FIGS. 3 and 3A (the latter describing a view from above of the joysticks 21 and 22), the joystick 21 makes it possible to detect four displacements D21-1, D21-2, D21-3, D21-4 of the distal part 21d of the lever 21 with regard to its support 21b:

a displacement D21-1 can translate a setpoint from the pilot seeking to increase the overall thrust of the aircraft and induce an increase in altitude;

conversely to the displacement D21-1, a displacement D21-2 can translate a setpoint from the pilot for reducing the overall thrust of the aircraft and induce a loss of altitude;

a displacement D21-3 can translate a setpoint from the pilot for turning the aircraft 10 in the anticlockwise direction about the z axis according to FIG. 1A;

conversely to the displacement D21-3, a displacement D21-4 can translate a setpoint from the pilot for turning the aircraft 10 in the clockwise direction about the z axis according to FIG. 1A.

Again by way of example according to FIG. 3A, the joystick 22 makes it possible to detect four displacements D22-1, D22-2, D22-3, D22-4 of the distal part 22d of the lever 22 with regard to its support 22b:

a displacement D22-1 can translate a setpoint from the pilot seeking to induce a forward displacement of the aircraft;

conversely to the displacement D22-1, a displacement D22-2 can translate a setpoint from the pilot seeking to induce a backward displacement of the aircraft;

a displacement D22-3 can translate a setpoint from the pilot seeking to induce a displacement of the aircraft to port;

conversely to the displacement D22-3, a displacement D22-4 can translate a setpoint from the pilot seeking to induce a displacement of the aircraft to starboard.

A setpoint unit 20 moreover includes electronic means 23, such as one or more microcontrollers or microprocessors, to translate such displacements of the distal parts 21d and 22d of the levers 21 and 22 into electrical setpoint signals Gsp, these latter being intended to be carried to the control system 30 by radio or wired route CL. Such electronic means 23 can be duplicated in several redundant means and jointly generate a plurality of setpoint signals $\vec{Gsp}$.

Said setpoint unit 20 can moreover include other components such as push buttons for example to translate an order to start the thrusters, signal a loss of the capability of the pilot to ensure the piloting of the aircraft, switch from a manual piloting mode to an assisted piloting mode etc. Said electronic means 23 of the setpoint unit 20 are arranged to also communicate the information delivered by said components. Thus, said setpoint unit 20 can transmit a signal Gsp, or even a plurality of signals $\vec{Gsp}$ if the means 23 are redundant, for example of the PPM type, conveying a vector of items of information among which may be mentioned setpoints of position Xsp, of course/yaw Ψsp, setpoints for starting or stopping the thrusters, a piloting mode identifier, etc.

Figure 4:
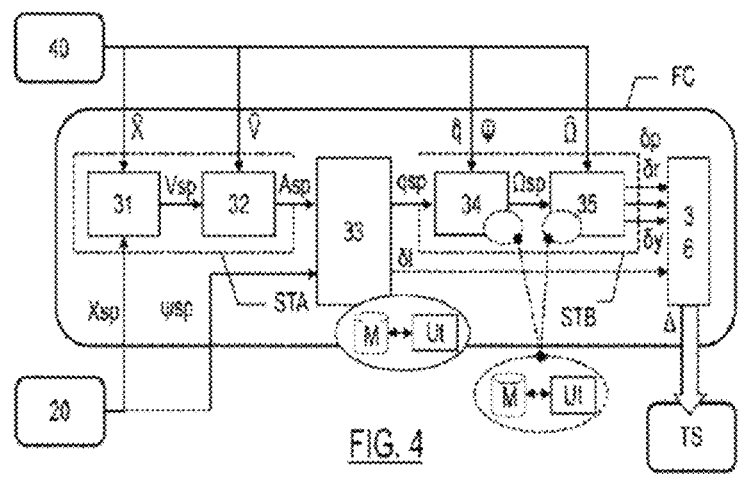
FIG. 4 illustrates the example of a functional architecture of a flight controller intended to equip a drone.

FIG. 4, for its part, describes a system 30 for controlling actuators TS, for example the thrust units TSa to TSd of an aircraft 10 according to FIG. 1. Said control system 30 integrates or cooperates with one or more inertial navigation systems 40 (accelerometers, gyroscopes, magnetometers), inertial navigation units (INUs), or even inertial measurement units (IMUs). Such a measurement unit 40 is designed in particular to estimate the positions $\hat{X}$ and linear $\hat{V}$ or angular $\hat{\Omega}$ velocities of the aircraft 10. The linear velocity $\hat{V}$ and the position $\hat{X}$ can be estimated with regard to the "NED (North-East-Down) Frame" reference system, determined by three orthogonal axes in which a first axis points towards true north, a second axis points towards the centre of the Earth and the third axis points towards the east. The attitude Ψ and the quaternion $\hat{q}$ as well as any angular velocity $\hat{\Omega}$ of the aircraft are generally estimated with regard to a reference system specific to the aircraft 10 such as the one illustrated by the x, y, z axes in FIG. 1A. Said linear velocities and said positions could possibly be corrected by a Kalman filter.

The control system 30 includes one or more flight controllers FC the purpose of which is to integrate the measurements delivered by the measurement unit or units 40 and the piloting setpoints delivered by the setpoint unit 20 to deliver to each thrust unit TSa to TSd (or more generally to an actuator TS) a command Δ, for example in the form of a PPM signal or equivalent, which can mainly convey components relating to the pitch δp, the roll δr, the yaw δy, the power/thrust δt.

FIG. 4 depicts more specifically a schematic diagram of an architecture of a flight controller FC for an aircraft such as the drone 10 illustrated in FIG. 1. According to this example, said flight controller FC includes a plurality of control devices constituting two main stages, referenced STA and STB in FIG. 4. The stage STA is responsible for regulating the position of the aircraft in the NED Frame reference system. According to the example illustrated in FIG. 4, overall the stage STA generates a setpoint acceleration Asp on the basis of, on the one hand, measurements coming from a measurement unit 40, in this case from the estimates of the position $\hat{X}$ and of the linear velocity $\hat{V}$ of the aircraft and, on the other hand, position setpoints Xsp delivered by a setpoint unit 20 such as the one described above with reference to FIGS. 3 and 3A.

The stage STB, for its part, is responsible for regulating the position of the aircraft in a reference system called the "body frame" reference system, specific to the platform of the aircraft 10 as illustrated by the x, y, z axes in FIG. 1A to deliver actuator command components Δ relating to the pitch δp, the roll δr, the yaw δy, on the basis of, on the one hand, the generation from the step STA (setpoint acceleration Asp) and the course/yaw setpoints Ψsp coming from the control unit and, on the other hand, measurements delivered by the measurement unit 40 in terms of attitude Ψ, quaternion $\hat{q}$, and angular velocity $\hat{\Omega}$. To this end, an interface 33 ensures a transposition of the points of reference such that the setpoint acceleration Asp and the course/yaw setpoints Ψsp are translated into a setpoint quaternion qsp and a component δt of the command Δ relating to the power/thrust.

Each stage STA and STB can be "cadenced" according to different periods or frequencies. The frequencies of regulations implemented by the two main stages STA and STB can be fifty hertz for stage STA and two hundred and fifty to one thousand hertz for stage STB.

According to the example illustrated in FIG. 4, each of said stages STA and STB includes two control devices 31, 32 for the stage STA and 34, 35 for the stage STB respectively.

The device 31 for controlling the position of the aircraft delivers a setpoint velocity Vsp on the basis of the difference between a setpoint position Xsp and an estimated position $\hat{X}$. This setpoint velocity Vsp is then compared by the control device 32 with the linear velocity $\hat{V}$ estimated by the measurement unit 40 in order to generate the setpoint acceleration Asp mentioned above.

For its part, the device 34 for controlling the attitude of the stage STB delivers a setpoint angular velocity Ωsp by comparing the setpoint quaternion qsp and the estimates of the quaternion $\hat{q}$ and of the attitude $\hat{\Psi}$ delivered by the measurement unit 40. This setpoint angular velocity Ωsp is then compared with the angular velocity $\hat{\Omega}$ of the aircraft estimated by said measurement unit 40 to ultimately generate the components of the control vector Δ relating to the pitch δp, the roll δr and the yaw δy by the device 35 for controlling the angular velocity of the stage STB.

Advantageously, the devices for controlling the position, 31, and the attitude, 34, generate respective outputs proportional to the differences separating their inputs. On the other hand, the devices 32 and 35 for controlling the linear and angular velocities generate outputs on the basis of components describing corrective actions respectively proportional to the difference between their inputs, to the integral and to the derivative of said difference for example by making use of a PID controller. Each control device can advantageously include its own processing unit Ut (for example in the form of one or more microprocessors or microcontrollers cooperating with a data and/or program memory M) that samples, according to a given frequency, the measurements and/or setpoints delivered by the measurement unit 40 and/or the setpoint unit 20 or more generally by sources delivering setpoints or measurement data items. Such a source, which can be called "setpoint source", can thus consist of a setpoint unit 20 as described above with reference to FIG. 3. This is the case for the flight controller 30, when the latter is considered in its entirety, or for the single position controller 31 of such a flight controller FC. Such a setpoint source can moreover consist of a device for controlling position, 31, or attitude, 34, or even of the interface 33, for the linear velocity 31 and angular velocity 35 control modules.

In a variant, such a flight controller FC can include only a single processing unit Ut responsible for implementing generation methods specific to the different electronic elements (position 31, attitude 34, linear velocity 32 or angular velocity 35 controllers, or the interface 33). Regardless of whether the processing unit Ut of a flight controller is centralized or decentralized, i.e. all or some of the different electronic elements of the latter includes its own processing unit Ut (FIG. 4 illustrates such a situation for the control modules 34 and 35), the behaviour of a processing unit Ut can be advantageously determined by means of an appropriate computer program the program instructions of which are loaded in the data and/or program memory or memories M cooperating with said processing unit.

Figure 5:
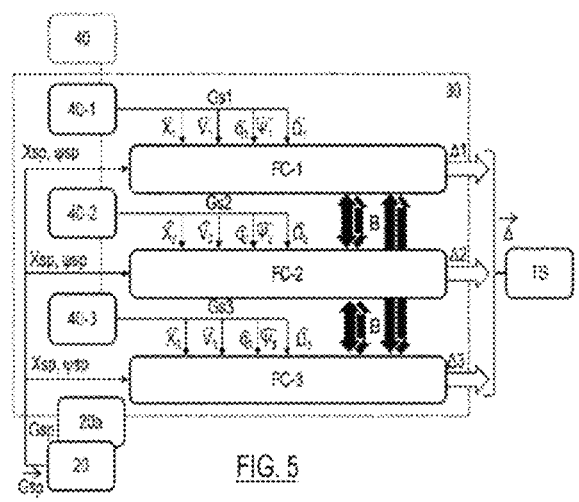
FIG. 5 illustrates an example of the functional architecture of a system according to the invention for controlling an actuator such as a thrust unit of an aircraft including a plurality of redundant flight controllers which may possibly be similar to the flight controller shown in the preceding figure.

FIG. 5 illustrates an embodiment of such a system 30 for controlling an actuator TS according to the invention for which measurement, communication and/or data processing elements are duplicated for the sake of reliability. According to this example, three flight controllers FC-1, FC-2 and FC-3, similar to the controller FC described above with reference to FIG. 4, are arranged within said control system 30 to carry out similar processing on the basis of measurement data items coming from a measurement unit 40 and setpoint data items delivered by a setpoint unit 20. The three flight controllers FC-1 to FC-3 are thus individually responsible for generating a command Δ1, Δ2 or Δ3 for an actuator TS such as the thrust units TSa to TSd of an aircraft 10 already described with reference to FIG. 1. Said commands Δ1, Δ2 or Δ3 thus collectively form the command $\vec{\Delta}$ of the control system 30.

Unlike known control systems having multiple redundancy, i.e. including several flight controllers each generating a command Δ1, Δ2 or Δ3 independently of each other on the basis of measurement data items GS and common setpoints Gsp, a control system 30 according to the invention is arranged such that said commands Δ1, Δ2 and Δ3 are jointly generated by the redundant flight controllers. To this end, said three flight controllers FC-1, FC-2 and FC-3 are arranged to be in communication with each other via a communication bus B such that each flight controller knows the values generated by its twins. More specifically, the control devices (such as the devices 31, 32, 34 and 35 illustrated in FIG. 4) respectively making up these latter and ensuring the position, attitude and linear and angular velocity regulations can themselves be capable of knowing the data items generated by their twins within the different flight controllers FC-1 to FC-3. According to an advantageous embodiment, such a communication bus B can consist of a CAN (controller area network) data bus, which is advantageously redundant, i.e. for example doubled up for the sake of reliability. Such a technological choice is advantageous for carrying a large number of data items via a single cable and dividing them between the different electronic elements of the control system 30.

The outputs or commands Δ1, Δ2 and Δ3 delivered respectively by the flight controllers FC-1, FC-2 and FC-3 can thus also be generated by these latter, and not independently of each other but jointly, i.e. taking account of the generations from the redundant flight controllers. Said commands Δ1, Δ2 and Δ3 thus jointly form a multiple redundancy command $\vec{\Delta}$ and are carried to the actuator TS, more specifically to an electronic controller thereof, said controller of the actuator TS itself optionally being able to be plural and redundant. Such a controller is encompassed in the concept of an actuator for the sake of simplicity in FIG. 5. Such a controller and/or actuator TS implements a policy for selection and/or arbitration between the different commands Δ1, Δ2 and Δ3 to carry out its action. By way of advantageous example, such a controller can generate a "single" command Δ on the basis of the plural command $\vec{\Delta}$ delivered by the control system 30 such that said command Δ consists of:

one of the commands Δ1, Δ2 and Δ3 generated respectively and jointly by the redundant flight controllers FC-1, FC-2, FC-3 when only two of said flight controllers retain their capability to generate such a command—this situation can occur when one of said three flight controllers malfunctions;

the median of said plurality $\vec{\Delta}$ of commands Δ1, Δ2 and Δ3 jointly generated by the redundant flight controllers.

In a variant, such a control system according to the invention can be arranged such that a "single" command Δ can be generated directly by the control system on the basis of the plurality $\vec{\Delta}$ of commands Δ1, Δ2 and Δ3 generated respectively and jointly by the three flight controllers FC-1, FC-2 and FC-3, in order to relieve the actuator TS of such an arbitration task. In this case, such a control system 30 can include an arbitration means (not shown in FIG. 5 for the sake of simplification) in order to formulate such a command Δ according to a technique similar to that disclosed above for the arbitration that an actuator can perform.

According to the example illustrated in FIG. 5, the measurement unit 40 can also be augmented in the form of three redundant measurement units 40-1, 40-2, 40-3 delivering their measurements to the three flight controllers FC-1, FC-2, FC-3 respectively. These latter can propagate to their twins, via the communication bus B, the measurement data items delivered by the dedicated measurement unit to each flight controller. Thus, according to the example illustrated by FIG. 5, the measurement unit 40-1 delivers measurement data items Gs1 to the flight controller FC-1 in the form of estimates of the position $\hat{X1}$, linear $\hat{V1}$ and angular $\hat{\Omega1}$ velocities of the aircraft 10, the attitude $\hat{\Psi1}$ and quaternion $\widehat{q1}$ thereof. In the same manner, the measurement unit 40-2 delivers measurement data items Gs2 to the flight controller FC-2 in the form of estimates of the position $\widehat{X2}$, linear $\widehat{V2}$ and angular $\widehat{\Omega2}$ velocities of the aircraft 10, the attitude $\widehat{\Psi2}$ and quaternion $\widehat{q2}$ thereof. Finally, the measurement unit 40-3 delivers measurement data items Gs3 to the flight controller FC-3 in the form of estimates of the position $\widehat{X3}$, linear $\widehat{V3}$ and angular $\widehat{\Omega3}$ velocities of the aircraft 10, the attitude $\widehat{\Psi3}$ and quaternion $\widehat{q3}$ thereof. In a variant, the three measurement units 40-1, 40-2, 40-3 could be connected via the communication bus B to the three flight controllers FC-1, FC-2, FC-3.

Via the communication bus B, the setpoint unit 20 delivers to the three flight controllers FC-1, FC-2 and FC-3 the setpoints Gsp relating to the positions Xsp, course and yaw $\vec{\Psi sp}$. Such a setpoint can also be plural $\vec{Gsp}$ when said setpoint unit has multiple redundancy. FIG. 5 also illustrates the possible presence of a navigation assistance module 20a, capable, as a supplement, of assisting the pilot and delivering setpoints Gsp relating to the positions Xsp, course and yaw $\Psi sp$ instead of or in addition to the setpoint unit 20.

In an ideal world, the three flight controllers FC-1, FC-2 and FC-3 would be perfectly identical, would have the capability to sample the data items or signals conveyed by the data bus B according to an infinite frequency and would thus share their generated data items with their twins instantly. The measurement units would for their part deliver estimates that are identical and not noisy. According to such an ideal world, there would not be any difference or any variance possible between the commands $\Delta1$, $\Delta2$ and $\Delta3$ delivered to the actuator TS. This ideal world is, however, utopian. Therefore, latencies exist between the reading or sampling performed by each flight controller, data items generated by its twins and the generation of its own data items. Indeed, the frequency of sampling of the data items available via the communication bus B cannot be unlimited, the measurement data items are noisy and can fluctuate depending on the measurement units 40-1, 40-2 and 40-3 under consideration and the electronics and clocks at the level of the respective control devices of the redundant flight controllers FC-1, FC-2 and FC-3 cannot be perfectly cloned or synchronized. Thus, the commands $\Delta1$, $\Delta2$ and $\Delta3$ deviate, or even diverge, over and over again with regard to one another and lose accuracy and relevance to the detriment of the piloting of the aircraft. In order to respond to such a reality and/or technological limitations, the invention provides distributing, at the level of each flight controller FC-1, FC-2, FC-3 within the control system 30, or even distributing, at the level of each control device 31, 32, 34, 35 of each of said flight controllers FC-1, FC-2, FC-3, a method for correcting the generated values of variables which takes into account the generations from control devices and/or twin flight controllers. Thanks to the implementation of such a method according to the invention, the commands $\Delta1$, $\Delta2$ and $\Delta3$ become jointly generated by the flight controllers FC-1, FC-2, FC-3 do not diverge in nominal operation (i.e. according to the design constraints), allowing the actuator TS to take account of coherent and accurate commands $\Delta1$, $\Delta2$ and $\Delta3$.

It is important to highlight that when the control system 30 only includes two redundant flight controllers or when only two flight controllers from among the three illustrated in FIG. 5 retain their generation capability, it is particularly advantageous for the redundant commands to remain coherent and not directing with respect to one another. Indeed, even if the actuator TS only takes account of a single one of the two commands during its arbitration, when a malfunction of the flight controller generating said command used until that point occurs and said actuator TS must at that moment select and use the second command instead of the first, which has become unavailable, the actuator does not undergo any marked change in terms of control and thus of behaviour. The situation would be very different if the generations from the two redundant flight controllers were performed in parallel, i.e. independently of one another and not jointly carried out as according to the invention. Indeed, without the contribution of the invention, the commands delivered respectively by the two redundant flight controllers could gradually diverge from one another. During a switching of commands, the behaviour of the aircraft would undergo a loss of continuity. Such a correction method specific to the invention allowing joint generations of redundant commands can be implemented by the processing unit of a flight controller FC according to FIG. 4 as such (i.e. in a centralized manner) or by one of the processing units of the different control devices 31, 32, 34 and 35 included therein (i.e. in a distributed manner). The expression "servo device" will hereinafter be used indiscriminately to denote a flight controller as such or a control device included therein.

In order to adapt the operation of such a servo device, program instructions that can be interpreted by the processing unit of said servo device can be loaded into a non-volatile memory M thereof. Such program instructions are therefore designed so that their execution by the processing units Ut of such servo devices causes the implementation of a method for correcting the generation of the values of the variables in question according to the invention. Such program instructions can constitute a computer program product as such and be conveyed or stored on any suitable memory support.

Figure 6:
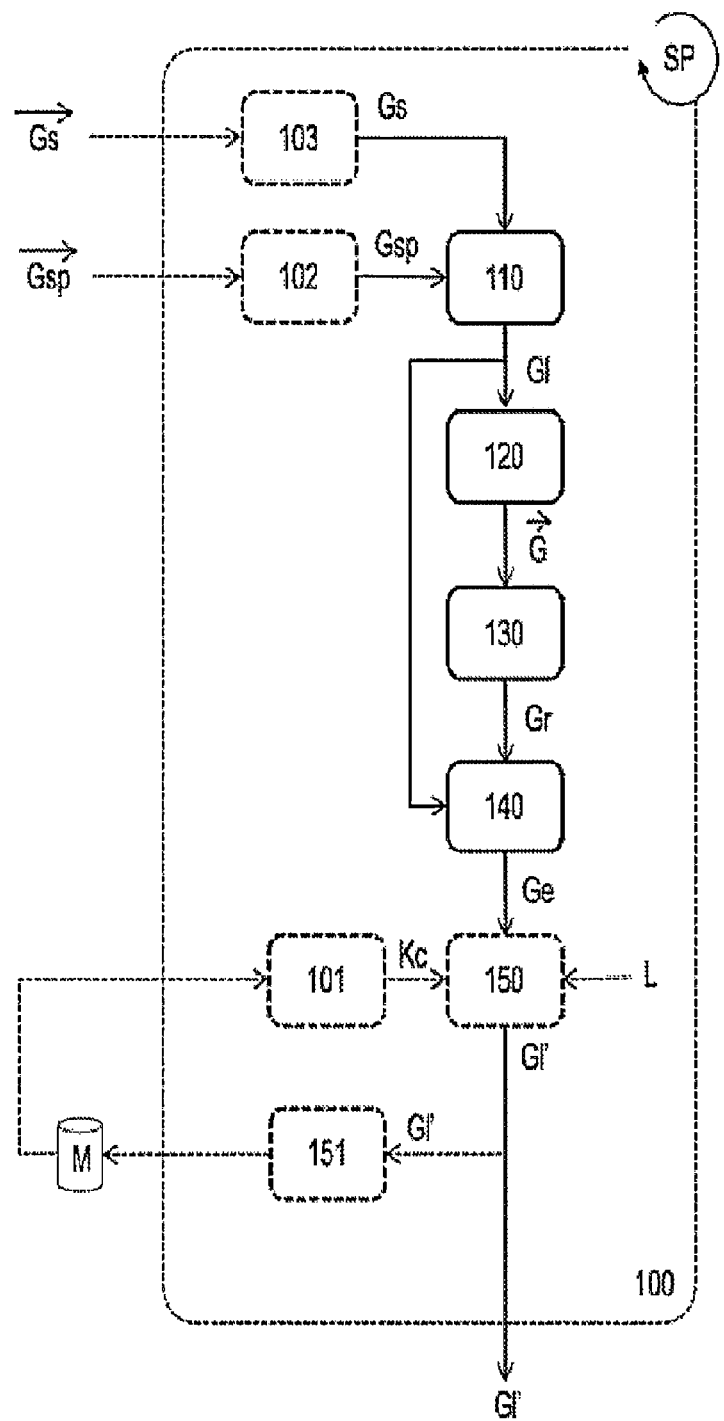
FIG. 6 illustrates a functional description of an example of a method for correcting a data item generated by a servo device of a system for controlling an actuator such as that described in FIG. 5.

FIG. 6 illustrates such a method 100 according to the invention intended to be implemented by the processing unit Ut of one servo device from among several redundant servo devices of a system for controlling an actuator. Advantageously, such a method 100 is provided to be implemented by each of said redundant servo devices. These latter are arranged to respectively generate values of one and the same variable G on the basis of one and the same setpoint Gsp and one and the same measurement data item Gs. In order to jointly generate such variables, said servo devices are in communication with each other, for example via a communication bus B as illustrated in FIG. 5, such that each servo device knows, i.e. can access, by reading, via said communication bus B, the latest values of said variable G generated by said redundant servo devices.

Such a method 100 is implemented iteratively according to a given frequency SP. As set out above, without in any way limiting the present invention, such a frequency SP can be selected to be comprised between fifty and one hundred hertz for a control device of a stage STA or between two hundred and fifty and one thousand hertz for a control device of a stage STB of a controller FC according to FIG. 4.

Such a method 100 includes a first step 110 of generating the value Gl of a variable G on the basis of a setpoint Gsp and a measurement data item Gs.

It includes, moreover, a step 120 of reading, for example via the communication bus B, the latest values of the variable generated by the redundant servo devices and of constructing a set $\vec{G}$ of current values of said variable G on the basis of said read-accessed values and of the value generated in step 110.

According to a first example of implementation by a system 30 for controlling an actuator TS according to FIG. 5, said servo device implementing said method 100 can consist of the flight controller FC-1, the flight controllers FC-2 and FC-3 being the twin servo devices of the controller FC-1. In this case, the variable G mentioned is the actuator command $\vec{\Delta}$, the value Gl thereof being alternately the command Δ1 when said servo device implementing the method 100 is the controller FC-1 or the command Δ2 when, for its part, the servo device FC-2 implements said method 100, the flight controllers FC-1 and FC3 being the twin servo devices thereof, and so on for the flight controller FC-3. According to this first example, the set $\vec{G}$ consists of the commands Δ1, Δ2 and Δ3. The setpoint Gsp for its part consists of the components relating to the position Xsp, course and yaw Ψsp coming from a setpoint unit such as the unit 20 according to FIG. 5. The measurement data item Gs for its part consists of the entirety of the estimates of position $\hat{X}$, linear velocity $\hat{V}$, attitude $\hat{\Psi}$ and quaternion $\hat{q}$, as well as the angular velocity $\hat{\Omega}$ delivered by a measurement unit 40 according to said FIG. 4, or even of the estimates delivered respectively by the redundant measurement units 40-1, 40-2 and 40-3 according to the example illustrated in FIG. 5.

According to a second example of implementation of a method 100 according to the invention implemented by a control system 30 for an actuator TS according to FIG. 5, the redundant servo devices implementing said method 100 can be the respective linear velocity controllers 32 of the flight controller FC-1 and FC-2 and FC-3, or even the respective angular velocity controllers 35 of said flight controllers FC-1 and FC-2 and FC-3 (when these latter are constituted like the flight controller FC illustrated in FIG. 4). In the case in which said redundant servo devices are the linear velocity controllers 32, the variable G is a setpoint acceleration Asp, or more specifically the component thereof reflecting the integral action when said velocity controller 32 includes a PID controller. The setpoint Gsp for its part consists of the setpoint linear velocity Vsp, itself generated by a position controller of said flight controller FC-1, FC-2 or FC-3 in question. The set of values $\vec{G}$ consists of the setpoint accelerations Asp generated by the twin velocity control devices 32 or by the single components of said setpoint acceleration Asp reflecting the integral action of the PID controllers of the twin velocity controllers.

In a variant or in addition, said redundant servo devices implementing a method 100 according to the invention can consist of the respective position control devices 31 of the flight controllers FC-1, FC-2 and FC-3. The variable G under consideration is then the setpoint linear velocity Vsp. The setpoint Gsp for its part consists of the components relating to the position Xsp, course and yaw Ψsp coming from a setpoint unit 20, the measurement data item Gs being the position of the aircraft estimated by a measurement unit 40, 40-1, 40-2, 40-3.

To couple, i.e. to jointly generate, the value of a variable with regard to the redundant servo devices, it is necessary to correct the value generated in step 110 to take account of the generations from said redundant or twin servo devices. To this end, a method 100 according to the invention moreover includes a step 130 of determining a reference value Gr of said variable taken from the set $\vec{G}$, i.e. selected from among the values forming said set $\vec{G}$ in the step 120.

When the actuator control system 30, the elements of which each implement said method 100 in a distributed manner, includes at least three redundant servo devices (such as the controllers FC-1, FC-2, FC-3 or the position, attitude, and/or linear or angular velocity controllers thereof) capable of generating and communicating a value of the variable G, the invention provides that the step 130 of determining the reference value Gr can consist of determining the median of said values forming the set $\vec{G}$ of current values of the variable G. By "median" is meant the mid point of a data set, in this case the set $\vec{G}$, such that fifty percent of said data items have a value smaller than or equal to the median and fifty percent of said data items have a value greater than or equal to said median. In a small data set, it suffices to count the number of data items and to order them according to their respective values in increasing order. If the number of data items is an odd number, it is necessary to increase said number by one unit, then to divide it by two in order to obtain the rank which denotes the median value. The rank is the position of a value one the set $\vec{G}$ is ordered: the lowest value corresponds to the first rank, the second lowest value to the second rank etc. According to the example of a triple redundancy system, the median will thus be selected as the value of the variable of the second rank, or yet again the intermediate value between the two minimum and maximum values. Opting for the median makes it possible to avoid aberrations caused by certain previous techniques which favour the average or a unitary selection, when a generation from one of the servo devices clearly deviates with respect to the others.

On the other hand, when the control system 30 only includes two redundant servo devices, or even when only two servo devices from among a plurality remain capable of generating a value of the variable G, the step 130 of determining the reference value Gr consists of selecting, from within the set $\vec{G}$ of current values of the variable G, one of the current values of said variable generated by the first or the second servo device remaining capable of generating a value of the variable G. Such a choice can incline towards the servo device having the lowest index number when said redundant servo devices are identified by such an index or also according to any other technique opting for an alternation or a random selection.

A method 100 subsequently includes a step 140 of calculating a difference Ge between the current value Gl of the variable G generated in step 110 and said reference value Gr then a step 150 of generating a corrected current value Gl' of the variable G consisting of the implementation of an operation of subtracting a corrective Gc. The last value consists of a calculation according to which said difference Ge is multiplied by a correction coefficient Kc of said current value Gl resulting from step 110. In this way, the final generation Gl' from each of the redundant servo devices is coupled to those of the other redundant servo devices. These latter indeed jointly generate corrected values Gl' of the variable G.

In order to implement a step 150 of generating a corrected current value Gl' of the variable G, the value of the correction coefficient Kc which induces a coupling of the respective generations from the redundant servo devices can be predetermined and for example written in a memory M of each servo device. The selection of said value of the correction coefficient Kc induces different notable technical effects on the behaviour sought for the control system 30 as will be seen later with reference to FIGS. 7, 7A and 8. According to the variable G under consideration, said value of the correction coefficient Kc can be selected as being equal to one, meaning that the entirety of the difference Ge between the current value Gl of the variable G generated by one of the redundant servo devices and the reference value Gr is subtracted from said current value Gl, the latter taking as a value said reference value Gr. In a variant, only a fraction of said difference Ge can be subtracted from said current value Gl to generate the corrected value Gl'. Thus, said correction coefficient value Kc can be selected empirically, for example according to a criterion on the basis of the variability of the variable G with regard to the frequency SP in order to sample, in step 120, the values generated by the twin servo device or devices, i.e. in order to build up the set $\vec{G}$ of current values of the variable G generated by the set of redundant servo devices. For example, a correction coefficient Kc having a low value, for example of the order of five percent, will be favoured for a variable G the values of which vary greatly with regard to the frequency SP and conversely a coefficient close or equal to one hundred percent in the opposite case. It is also possible to choose a small correction coefficient Kc in the presence of a significant latency between the current values generated by the different redundant servo devices to build up the sets $\vec{G}$ and a value close or equal to one hundred percent in the opposite case. It is thus possible to favour a Kc value comprised, for example, between eighty and one hundred percent when the variable G in question is the component reflecting the integral action of a PID controller of a linear velocity control 32. In a variant or in addition, it is possible to favour a Kc value comprised between five and thirty percent when the variable G in question is the component reflecting the integral action of a PID controller of an angular velocity control 35 for example. The invention would not be limited to these example configurations alone. A memory M of a servo device can thus include a table of possible values for said correction coefficient Kc according to the variable G in question, according to the performance of the communication means B in order to exchange the respective generations from the redundant servo devices or even the respective iteration frequencies SP of each of these latter.

The determination of a correction value Kc can be predetermined in the design phase or the phase of adjustment of the control system or in the simulation phase of such a system 30 in order to adjust the technical coupling effect sought by the implementation of the method 100 according to the variable or variables G under consideration.

In a variant, the values of said correction coefficient Kc can be dynamic and adjusted in real time by each redundant servo device of the control system. In this case, the invention provides that such a servo device can build up, in a step 151, a log of a determined number of values of the variables Gl generated in step 110 or the variables Gl' corrected in step 150 so as to estimate its variability. Thus, in a step 101, prior to the implementation of step 150, or even according to a frequency of execution lower than the iteration frequency SP of steps 110, 120, 130, 140 and 150, the value of said correction coefficient Kc can be dynamically adjusted depending on the estimate of the variation of the preceding values of the variable G and of the iteration frequency SP of step 120 of building up the set $\vec{G}$. Such an adjustment 101 can be determined by means of preestablished calculation rules. According to an embodiment variant, such an adjustment 101 can be implemented by a neural network previously trained using data items collected via numerous flight simulations for example, or more generally servoing different variables.

The invention provides, in a variant or in addition to the weighting of the value of the corrective Gc by the selection of an appropriate correction coefficient Kc with respect to a particular variable G in question, limiting, in absolute values, the value of said corrective Gc before subtracting it from the value Gl generated in step 110. To this end, the step 150 of generating the value of the corrective Gc can be arranged to limit the latter, in absolute values, to a limit value L. Thus, when the value of the corrective Gc calculated on the basis of the difference Ge between the current value Gl of the variable G and the reference value Gr exceeds, in absolute values, said limit value L, the absolute value of said corrective Gc takes as a value said limit value L. By way of non-limitative example, such a value L can be calculated as a percentage of the reference variable Gr that is strictly greater than zero and below thirty percent.

This double parameterization of step 150 by the value of the correction coefficient Kc on the one hand and by the limit value L on the other hand offers a very great finesse for adjusting the behaviour expected by a control system 30 of an actuator TS according to the invention.

As shown in FIG. 5, certain input data items of a servo device can be redundant, i.e. coming from a plurality of sources. This can be the case when measurement data items are delivered to said servo device by a plurality of redundant sources or when, via the communication bus B, it is provided to intentionally inject, at the input to said servo device, values generated by third-party servo devices that are also redundant. For example, with reference to FIGS. 4 and 5, it can be provided to inject, at the input to a linear velocity servo device 32, on the one hand the estimates of the linear velocity of the aircraft delivered by the measurement units 40-1, 40-2, 40-3 and on the other hand the setpoint linear velocities delivered respectively by the position control devices 31 of the different flight controllers FC-1, FC-2, FC-3.

It could be the same for the respective position 31, attitude 34 or angular velocity 35 controllers of the redundant flight controllers FC-1, FC-2 and FC-3.

Thus, with reference to FIG. 6, when a setpoint Gsp consists of a plurality of values $\vec{Gsp}$ delivered respectively by redundant sources delivering said setpoint of the actuator control system, a method 100 according to the invention can include a step 102 for generating said setpoint Gsp such that the latter takes as a value:

one of the values of said plurality when this latter, $\vec{Gsp}$, only comprises two values, i.e. when only two redundant sources deliver such a setpoint;

the median of said plurality of values when this latter, $\vec{Gsp}$, comprises at least three values, i.e. when at least three redundant sources deliver such a setpoint.

In the same, when the step 110 of generating the value Gl of a variable G is implemented on the basis of a setpoint Gsp and a measurement data item Gs consisting of a plurality of values $\vec{Gs}$ delivered respectively by redundant sources of said control system (for example the measurement units 40-1, 40-2, 40-3 according to FIG. 5), a method 100 according to the invention can advantageously include a step 103 for generating said measurement data item Gs such that the latter takes as a value:

one of the values of said plurality of values $\vec{Gs}$ when this latter, $\vec{Gs}$, only comprises two values, i.e. when only two redundant sources deliver a measurement data item;

the median of said plurality of values when this latter, $\vec{Gs}$, comprises at least three values, i.e. when at least three redundant sources deliver such a measurement data item.

Figure 7:
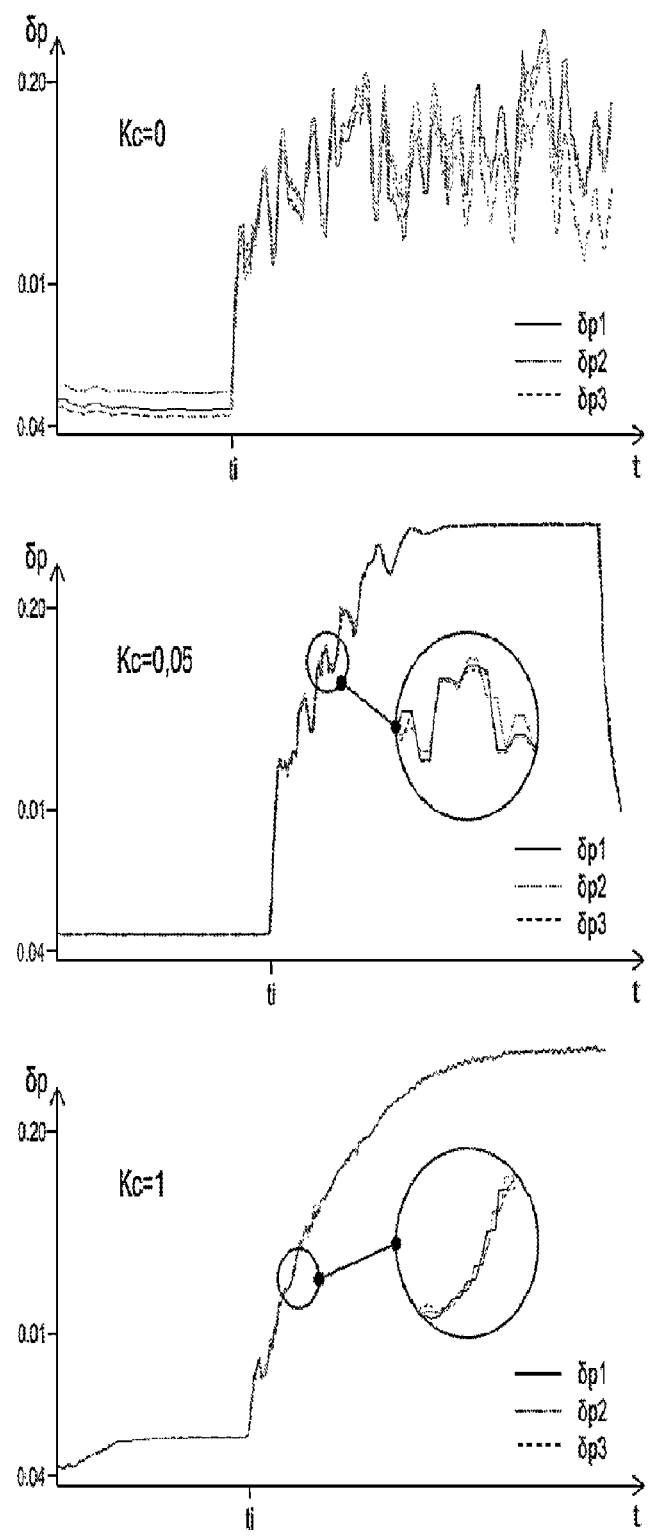
FIG. 7 illustrates a first notable contribution obtained by the implementation of the invention with reference to the generation of a pitch actuator command by a control system according to FIG. 5.
Figure 7A:
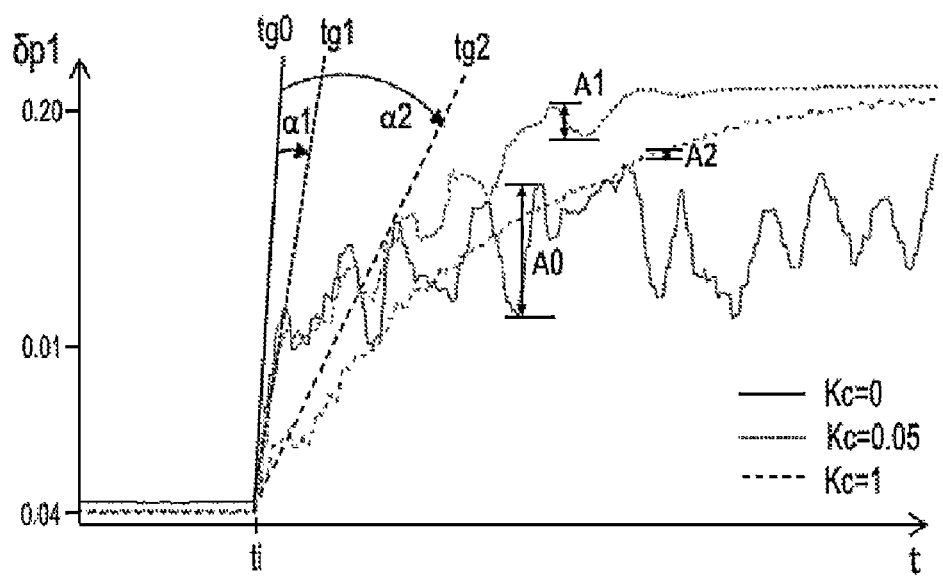
FIG. 7A illustrates a second contribution obtained by the implementation of the invention with reference to such a pitch actuator command generated by a control system according to FIG. 5.
Figure 8:
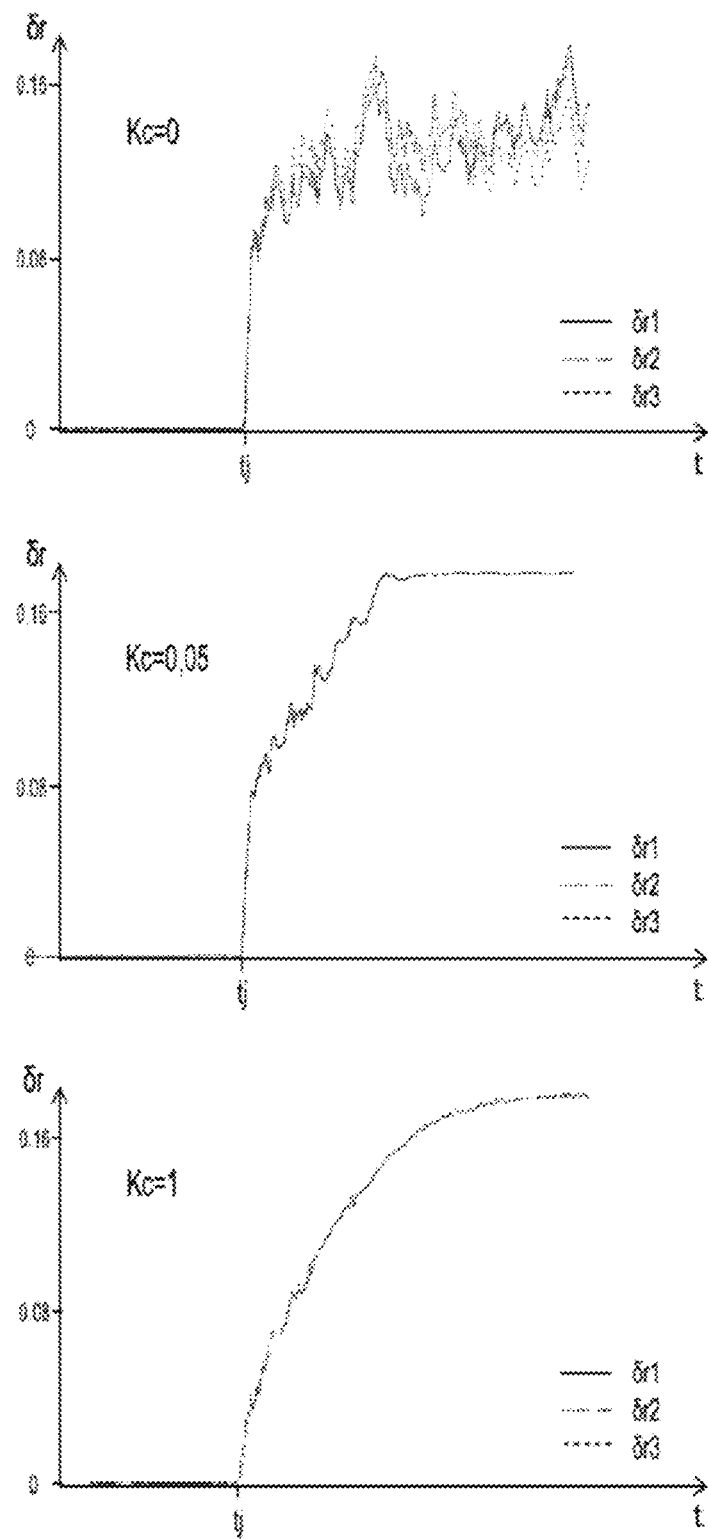
FIG. 8 illustrates the notable contribution obtained by the implementation of the invention with reference to a roll actuator command generated by a control system also according to said FIG. 5.

With reference to FIGS. 4 and 5, FIGS. 7, 7A and 8 make it possible to illustrate the different contributions obtained by the implementation of the invention and the impact of the choice of the value of the correction coefficient Kc on the behaviour of a control system according to the invention. The two FIGS. 7 and 8 illustrate respectively two variables G, in this case the components relating to the pitch δp, the roll δr of the command $\vec{\Delta}$, and more particularly, the components of these variables reflecting the integral action of a PID controller of an angular velocity controller 35 according to FIG. 4.

FIG. 7 describes more specifically the components reflecting the integral action of the component of the command $\vec{\Delta}$ relating to the pitch δp respectively generated by the flight controllers FC-1, FC-2 and FC-3. Thus, the respective generations associated with the pitch δp of said flight controllers appear:

in curves having a solid line for the controller FC-1 (component δp1);
in dotted curves for the controller FC-2 (component δp2);
in curves having a broken line for the controller FC-3 (component δp3).

Said FIG. 7 illustrates the respective generations over time t from said flight controllers FC-1, FC-2 and FC-3 according to three separate values of the correction coefficient Kc, respectively equal to zero, five hundredths and one via three separate graphs. The top graph corresponds to a zero value (Kc=0) of the correction coefficient Kc, i.e. a situation according to the state of the art (no correction of the respective generations from the flight controllers FC-1, FC-2 and FC-3 is implemented). The middle graph corresponds to a value of the correction coefficient Kc equal to five hundredths (Kc=0.05), i.e. a partial coupling of the respective generations from the flight controllers FC-1, FC-2 and FC-3. Finally, the bottom graph corresponds to a value of the correction coefficient Kc equal to one (Kc=1), i.e. a total coupling of the respective generations from said flight controllers FC-1, FC-2 and FC-3.

It can be noted that, when the value of the correction coefficient Kc is zero (situation illustrated by the top graph in FIG. 7), the servo devices, in this case the PID controllers of the angular velocity controllers 35 of the flight controllers FC-1, FC-2 and FC-3, are not coupled. The three curves δp1, δp2 and δp3 describing their respective generations have an increasing divergence and very marked fluctuations. However, the implementation of the invention induces a remarkable technical effect of convergence and coherence of the respective generations from said flight controllers, FC-1, FC-2 and FC-3, as displayed in the middle and bottom graphs in FIG. 7 showing the three curves δp1, δp2 and δp3 which can almost be superposed with the naked eye translating an excellent immediate coupling as soon as the correction coefficient Kc is greater than zero. A very low value, five hundredths according to the example illustrated by the middle graph in FIG. 7, causes a very good coupling symbolized by an almost perfect superposition of the three curves δp1, δp2 and δp3 (as indicated by the partial enlargement of said curves). The same applies to a total coupling obtained by selecting a value of the correction coefficient Kc equal to one. The curves δp1, δp2 and δp3 are also perfectly superposed, which is synonymous with a very strong coupling and a total coherence, as indicated by the partial enlargement of said curves δp1, δp2 and δp3. If the two middle and bottom graphs relating respectively to the values of the correction coefficient Kc five hundredths and one are considered more specifically, it can be noted that, beyond the aligned and coupled generations from the three flight controllers FC-1, FC-2 and FC-3, the value of the correction coefficient Kc equal to five hundredths maintains a high responsiveness (the slope of the curves δp1, δp2 and δp3 is very steep or vertical at an instant ti for which the system responds to a setpoint likely to cause a significant dip of the value of the components δp1, δp2 and δp3. Such a responsiveness can nevertheless be reduced by a value greater than the correction coefficient Kc (value equal to one, in this case for the bottom graph in FIG. 7). The slope of the curves δp1, δp2 and δp3 is indeed less vertical at the instant ti. However, said superposed curves δp1, δp2 and δp3 are smoother or more stable than those represented in the middle graph and even more so than those illustrated by the top graph (no correction). The choice of the correction coefficient value Kc thus makes it possible to determine a compromise between the responsiveness and stability sought. This impact on the responsiveness and the stability is illustrated more precisely by FIG. 7A. This superposes three curves describing the values of the single component relating to the pitch δp1 generated by the flight controller FC-1 respectively for three different values of the correction coefficient Kc:

as a curve having a solid line for a Kc value of zero (K=0);
as a dotted curve for a Kc value equal to 5 hundredths (K=0.05);
as a curve having a broken line for a Kc value equal to one (K=1).

The respective tangents tg0, tg1 and tg2 to the three δp1 curves mentioned above (respectively for Kc=0, Kc=0.05 and Kc=1) at the instant ti when the system responds to a setpoint likely to cause a significant dip of the value of said component δp1 are shown in FIG. 7A. The tangent tg0, which is almost vertical and illustrated as a solid line, illustrates the very high responsiveness of the control system in the absence of coupling (Kc=0) with the respective generations from the redundant flight controllers FC-2 and FC-3. The tangent tg1, illustrated as a dotted line, still displays a very high responsiveness of the control system during a weak coupling (Kc=0.05). Indeed, an angle α1, determined by the tangents tg0 and tg1, having a low value translates a slight decrease in responsiveness. The tangent tg2, illustrated as a broken line, illustrates the responsiveness of the control system during a strong coupling (Kc=1). The angle α2 determined by the tangents tg0 and tg2 is much larger than the angle α1 displaying a lower responsiveness.

However, said FIG. 7A illustrates the provision of stability in exchange for a possibly reduced responsiveness. Thus, the average amplitude of the variations of said component δp1 is very high (this being illustrated by the segment A0 in FIG. 7) which is synonymous with instability, while, as soon as the invention obtains a coupling between the respective generations from the redundant flight controllers, even if it is minimal (value of the correction coefficient Kc=0.05), such an average amplitude shown by the segment A1 becomes very low, or even almost zero as indicated by the segment A2 illustrating said average amplitude for a strong coupling (Kc=1).

Remarkable and similar contributions procured by the invention can be noted by observing FIG. 8, when it is implemented to couple other respective generations from the three flight controllers FC-1, FC-2 and FC-3, in this case the component reflecting the integral action of the PID controller of the angular velocity controller 35 with reference to the component of the command $\vec{\Delta}$ relating to the roll δr.

Indeed, said FIG. 8 describes the generations relating to the pitch δp commands respectively generated by the flight controllers FC-1, FC-2 and FC-3. These appear:
- as curves having a solid line for the controller FC-1 (component δr1);
- as dotted curves for the controller FC-2 (component δr2);
- as curves having a broken line for the controller FC-3 (component δr3).

Like FIG. 7, said FIG. 8 illustrates the respective generations from said flight controllers FC-1, FC-2 and FC-3 over time t, according to three separate values of the correction coefficient Kc respectively equal to zero, five hundredths and one by means of three separate graphs present respectively in the top, middle and bottom parts of said FIG. 8. The top graph corresponds to a zero value of the correction coefficient Kc, i.e. a situation according to the state of the art (no correction of the respective generations from the flight controllers FC-1, FC-2 and FC-3 is implemented). The middle graph corresponds to a value of the correction coefficient Kc equal to five hundredths, i.e. a partial coupling of the respective generations from the flight controllers FC-1, FC-2 and FC-3. Finally, the bottom graph corresponds to a value of the correction coefficient Kc equal to one, i.e. a total coupling of the respective generations from said flight controllers FC-1, FC-2 and FC-3.

It can be noted that, when the value of the correction coefficient Kc is zero (situation illustrated by the top graph in FIG. 8), the servo devices, in this case the PID controllers of the angular velocity controllers 35 of the flight controllers FC-1, FC-2 and FC-3, are not coupled. The three curves δr1, δr2 and δr3 describing their respective generations have an increasing divergence and very marked fluctuations. Conversely, the implementation of the invention shows an immediate coupling as soon as the correction coefficient Kc is greater than zero. A very low value, five hundredths according to the example illustrated by the middle graph in FIG. 8, causes an almost perfect superposition of the three curves δr1, δr2 and δr3. The same applies to a total coupling obtained by selecting a value of the correction coefficient Kc equal to one. The curves δr1, δr2 and δr3 are perfectly superposed, which is synonymous with a very strong coupling and a great cohesion. If the two middle and bottom graphs relating respectively to the values of the correction coefficient Kc five hundredths and one are considered more specifically, it can be noted that, beyond the coherent generations from the three flight controllers FC-1, FC-2 and FC-3, the value of the correction coefficient Kc equal to five hundredths maintains a high responsiveness. Indeed, the slope of the curves δr1, δr2 and δr3 is very steep or vertical at an instant tj for which the system responds to a setpoint likely to cause a significant dip of the value of said components δr1, δr2 or δr3. However, such a slope is less vertical, if the values of said components δr1, δr2 and δr3 induced by a value greater than the correction coefficient Kc (value equal to one, in this case for the bottom graph in FIG. 8) are considered. Conversely, said superposed curves are smoother or more stable than those represented in the middle graph. This FIG. 8 confirms that the choice of the correction coefficient value Kc thus makes it possible to determine the compromise between the sought responsiveness and stability of the system.

The invention has been described by means of different configurations of a system for controlling actuators, more specifically thrust units of an aircraft. The invention is not limited to this single example of a system for controlling actuators. It relates more generally to any control system including one or more multiple redundancy servo devices applied to home automation, to industry, or to land, sea, air or space vehicles, whether said actuators make it possible to move these latter or to regulate the temperature, the atmosphere or the luminosity prevailing within them.

The invention claimed is:

1. Method implemented by a processing unit of one servo device from among several redundant servo devices of a system for controlling an actuator, each redundant servo device generating values of one and the same variable on the basis of one and the same setpoint and one and the same measurement data item, said generated values being used by said system in order to control the actuator, said redundant servo devices moreover being in communication with each other so that each redundant servo device accesses, by reading, the latest values of said variable generated by said redundant servo devices, said method being characterized in that it iteratively includes:
    - a step of generating the current value of the variable on the basis of the setpoint and the measurement data item;
    - a step of reading the latest values of the variable generated by the redundant servo devices and building up a set of current values of said variable;
    - a step of determining a reference value of said variable taken from said set;
    - a step of calculating a difference between the current value of the generated variable and said reference value;
    - a step of correcting the current value and generating a corrected current value of the variable consisting of subtracting from said current value a correction value resulting from a calculation according to which said difference is multiplied by a correction coefficient of said current value.

2. Method according to claim 1, in which:
    the system includes at least three redundant servo devices capable of generating a value of the variable;
    the step of determining the reference value consists of selecting the median of the values of the set of the current values of the variable.

3. Method according to claim 1, in which:
    the system includes only two redundant servo devices capable of generating a value of the variable;
    the step of determining the reference value consists of selecting one of the values of the set of the current values of the variable.

4. Method according to claim 1, in which the value of the correction coefficient is predetermined.

5. Method according to claim 1, including a step of recording the current or corrected value of the variable in a data memory (M) of the first servo device in order to build up a log of a determined number of values and, prior to the correction step, a step of generating the value of the correction coefficient which is a function of the variability of the values taken from said log and the iteration frequency of the step of reading the latest values of the variable generated by the redundant servo devices.

6. Method according to claim 1, in which calculating the value of the correction value is arranged so that said value of the correction value does not, in absolute values, exceed a predetermined limit value.

7. Method according to claim 1, in which the redundant servo devices each include a PID corrector delivering three components of an output signal respectively describing a proportional action, an integral action and a derivative action, and in which the variable consists of the component describing said integral action of said PID corrector.

8. Method according to claim 1, when the control system includes redundant sources arranged to jointly deliver a plurality of setpoint values, including a step for generating said setpoint such that the latter takes as a value:
one of the values of said plurality of values when the control system only includes two redundant sources;
the median of said plurality of values when said control system comprises at least three redundant sources.

9. Method according to claim 1, when the control system includes redundant sources arranged to jointly deliver a plurality of values of the measurement data item, including a step for generating said measurement data item such that the latter takes as a value:
one of the values of said plurality of values when the control system only includes two redundant sources;
the median of said plurality of values when the control system includes at least three redundant sources.

10. Servo device of a system for controlling an actuator, said system including a plurality of redundant servo devices each generating a value of one and the same variable on the basis of one and the same setpoint and one and the same measurement data item, said redundant servo devices being in communication with each other such that each servo device accesses, by reading, the latest values of said variable generated by the redundant servo devices, said servo device being arranged to implement a method according to claim 1.

11. Control system for an actuator including a plurality of redundant servo devices according to claim 1, said command being generated on the basis of the plurality of values of the variable generated jointly by the redundant servo devices.

12. System according to claim 1, in which said command is generated on the basis of:
one of the values of said plurality of values of the variable generated by the redundant servo devices when said plurality of values only comprises two values;
the median of said plurality of values of the variable generated by the redundant servo devices when said plurality of values comprises at least three values.

13. Vehicle for a load constituted by a pilot, a passenger and/or goods or merchandise including one or more actuators in the form of at least one thrust unit for moving said vehicle a command for which is generated by a control system according to claim 1.

14. Vehicle according to claim 1 consisting of an aircraft.

15. Computer program product including one or more program instructions that can be interpreted by a processing unit of one servo device from among a plurality of redundant servo devices of a system for controlling an actuator, said program instructions being capable of being loaded in a non-volatile memory of the servo device and designed such that the execution of said instructions by said processing unit causes the implementation of a method according to claim 1.

16. Non-transitory computer-readable storage medium including the instructions of a computer program product according to claim 1.

* * * * *